United States Patent [19]

Campbell et al.

[11] Patent Number: 4,597,248
[45] Date of Patent: Jul. 1, 1986

[54] METHOD OF OPERATING A ROLL BALER

[75] Inventors: Willis R. Campbell, Ephrata; John A. Merkey, Stevens, both of Pa.

[73] Assignee: Sperry Corporation, New Holland, Pa.

[21] Appl. No.: 694,864

[22] Filed: Jan. 25, 1985

[51] Int. Cl.$^4$ ............................................. A01D 39/00
[52] U.S. Cl. ........................................ 56/1; 56/341; 100/88
[58] Field of Search ................... 56/341, 1; 100/5, 88, 100/89

[56] References Cited

U.S. PATENT DOCUMENTS

| 2,833,206 | 5/1958 | Callum et al. | 100/79 |
| 3,914,926 | 10/1975 | Braunberger et al. | 56/341 |
| 4,045,947 | 9/1977 | Mast | 56/343 |

FOREIGN PATENT DOCUMENTS

| 64117 | 11/1982 | European Pat. Off. | 56/341 |
| 2848777 | 5/1980 | Fed. Rep. of Germany | 56/341 |
| 2111903 | 7/1983 | United Kingdom | 56/341 |

Primary Examiner—Gene Mancene
Assistant Examiner—David I. Tarnoff
Attorney, Agent, or Firm—Darrell F. Marquette; Frank A. Seemar; Larry W. Miller

[57] ABSTRACT

A method is provided for operating a roll baler having upper and lower bale forming devices that cooperate with each other to define a bale starting zone. The upper bale forming device extends around a drive member and around an indexing guide member which has a home position for disposing the upper bale forming device proximate to the lower bale forming device at the rear of the bale starting zone. The drive member is engaged with a power source such as a tractor PTO to move the upper bale forming device in a direction to start a roll bale in the bale starting zone. When the roll bale reaches a predetermined diameter, the indexing guide member is moved in a substantially circular path of travel generally about the periphery of the roll bale. The drive member is disengaged from the power source when the indexing guide member has moved to another position. Subsequently, the drive member is reengaged with the power source when the indexing guide member has returned to its home position.

3 Claims, 6 Drawing Figures

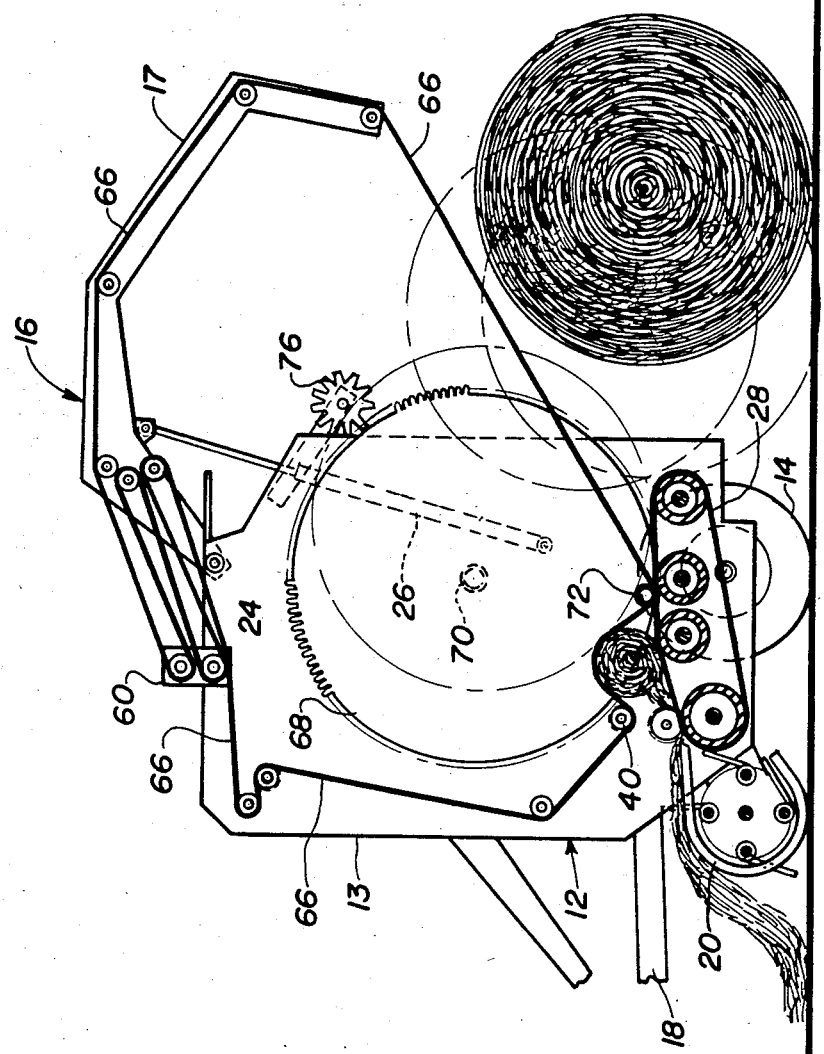

METHOD OF OPERATING A ROLL BALER

SUMMARY OF THE INVENTION

The present invention provides a method of operating a roll baler having upper and lower bale forming means cooperating to define a bale starting zone. The upper bale forming means extends around an indexing guide member and around a drive member. The indexing guide member has a home position for disposing the upper bale forming means proximate to the lower bale forming means at the rear of the bale starting zone. According to the method of the present invention, the drive member is engaged with a power source to move the upper bale forming means in a direction to start a roll bale in the bale starting zone. When the roll bale reaches a predetermined diameter, the indexing guide member is moved from its home position in a substantially circular path of travel generally about the periphery of the roll bale. The drive member is disengaged from the power source when the indexing guide member has been moved to another position. When the indexing guide member has returned to its home position, the drive member is reengaged with the power source.

DESCRIPTION OF THE DRAWINGS

FIG. 6 is a side view of the roll baler of FIG. 1 during discharge of a completed roll bale.

DESCRIPTION OF THE PREFERRED EMBODIMENT

Figure 1:
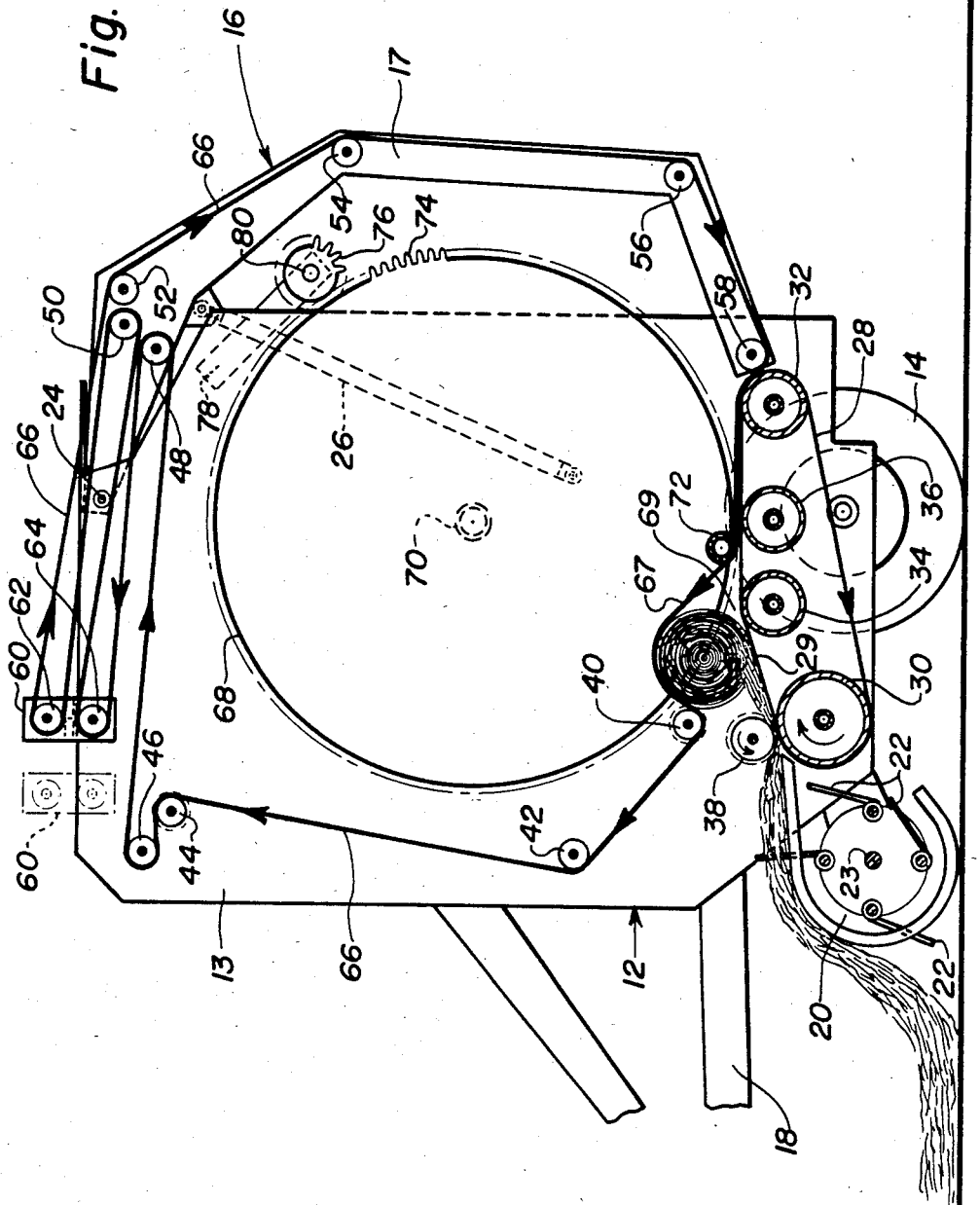
FIG. 1 is a side view of a roll baler embodying the present invention as a roll bale is being started.

Referring to FIG. 1, a roll baler 10 is similar to the type disclosed in U.S. Pat. No. 3,914,926 granted Oct. 28, 1975, to Benjamin A. Braunberger et al and incorporated herein by reference. The type of baler disclosed in this patent has been manufactured and sold by Gehl Company as Model Nos. 1400 and 1600. The roll baler 10 includes a main body portion or frame 12 supported by a pair of wheels 14, and an auxiliary body portion or tailgate 16. A tongue 18 is provided on the frame 12 for connection to a tractor. A pickup device 20 mounted on the frame 12 includes a plurality of tines 22 rotatable about a shaft 23 for engaging and picking up crop material arranged in windrows on the ground.

The frame 12 includes a pair of sidewalls 13 which are vertically oriented and spaced apart. The tailgate 16 includes a pair of side members 17 rigidly connected together by cross members (not shown). The side members 17 of the tailgate 16 are pivotally connected by stub shafts 24 to the sidewalls 13 of the frame 12. A pair of hydraulic cylinders 26 are connected between the sidewalls 13 of the frame 12 and the side members 17 of the tailgate 16 for moving the tailgate 16 between the closed position shown in FIG. 1 and the open position shown in FIG. 6.

Lower bale forming means such as a conveyor 28 in the form of an endless belt extends between the sidewalls 13 of the frame 12 and is supported on front and rear rollers 30 and 32, respectively, which are rotatably carried on the frame 12. The upper run 29 of the conveyor 28 is supported between the front and rear rollers 30,32 by intermediate rollers 34 and 36 which are also rotatably carried on the frame 12. A press roller 38 extends between and is supported on the sidewalls 13 of the frame 12 directly above the front roller 30 of the conveyor 28 to compress incoming crop material into a mat. The press roller 38 and the front roller 30 of the conveyor 28 are connected by conventional drive means (not shown), such as chains and sprockets, to the power take off unit (PTO) of a tractor in a manner to cause rotation of the press roller 38 and the conveyor front roller 30 in the directions indicated in FIG. 1. The upper run 29 of the conveyor 28 moves rearward from the front roller 30 to the rear roller 32.

A plurality of guide members or rollers 40,42,44 and 46 extend between and are rotatably supported on the sidewalls 13 of the frame 12. Another plurality of guide members or rollers 48,50,52,54,56 and 58 extend between and are rotatably supported on the side members 17 of the tailgate 16. Shuttle members 60 are slidably mounted on the sidewalls 13 of the frame 12 for back and forth movement in a substantially horizontal direction near the top of the frame 12. A pair of guide members or rollers 62 and 64 extend between and are rotatably carried by the shuttle members 60. Upper bale forming means preferably comprised of a series of belts 66 which are endless extend around the aforementioned guide members or rollers in a side-by-side, spaced apart arrangement between the sidewalls 13 of the frame 12 and also between the side members 17 of the tailgate 16. The rollers 40 and 44 are connected to the PTO of a tractor by drive means (not shown) in a conventional manner to drive the belts 66 in the direction and along the path indicated in FIG. 1. The shuttle members 60 are urged forwardly toward the phantom position shown in FIG. 1 by spring mechanisms (not shown) to maintain a certain amount of tension in the belts 66.

According to the preferred embodiment of the present invention, a pair of disks 68 are disposed inside the frame 12 closely adjacent and parallel to the sidewalls 13 thereof. Each disk 68 is in the form of a flat circular plate. The disks 68 are fixed at their centers to stub shafts 70 which in turn are rotatably mounted in bearing members located in the sidewalls 13 of the frame 12. An indexing guide member in the form of a roller 72 is rotatably connected between the disks 68 at a location radially outwardly from the stub shafts 70. The indexing roller 72 extends transversely of the baler 10. Teeth 74 formed on the peripheral edges of the disks 68 are adapted for engagement with sprockets 76 rotatably mounted on brackets 78 attached to the sidewalls 13 of the frame 12. The sprockets 76 are connected by a cross shaft 80. One end of the cross shaft 80 is coupled to an electric clutch and brake device (not shown) such as Model No. IXC-931 manufactured by Warner Electric Corporation. This electric clutch and brake device may be selectively operated as either a clutch to allow the shaft 80 and the sprockets 76 to be rotated or as a brake to hold the shaft 80 and the sprockets 76 stationary.

With reference to FIG. 1, it will be seen that the belts 66 pass underneath the indexing roller 72 so that a lower span 67 of the belts 66 running from the indexing roller 72 to the drive roller 40 moves in substantially the opposite direction as the upper run 9 of the conveyor 28.

This relationship between the direction of movement of the lower span 67 of the belts 66 and the direction of movement of the upper run 29 of the conveyor 28 causes crop material to be coiled or wrapped in a manner to effectively start a roll bale. The lower span 67 of the belts 66 is expandable in length during bale formation.

OPERATION

As the baler 10 is towed across a field by a tractor, the pickup device 20 delivers crop material between the press roller 38 and the front of the conveyor 28. The upper run 29 of the conveyor 28 carries the crop material rearward into a bale starting zone 69 where it is engaged by the lower span 67 of the belts 66 which causes coiling of the crop material and formation of the core of a roll bale. During this stage of bale formation, the electric clutch and brake device (not shown) is operated as a brake so that the disks 68 are held stationary by the sprockets 76 and the indexing roller 72 is located in a home position as shown in FIG. 1 thereby causing the belts 66 to be pinched against the upper run 29 of the conveyor 28 at the rear of the bale starting zone 69. As the bale increases in diameter, the shuttle members 60 move rearward along the top of the frame 12 as shown in FIG. 1 against the force of the spring mechanisms (not shown). This allows the lower span 67 of the belts 66 to expand around the periphery of the bale.

Figure 2:
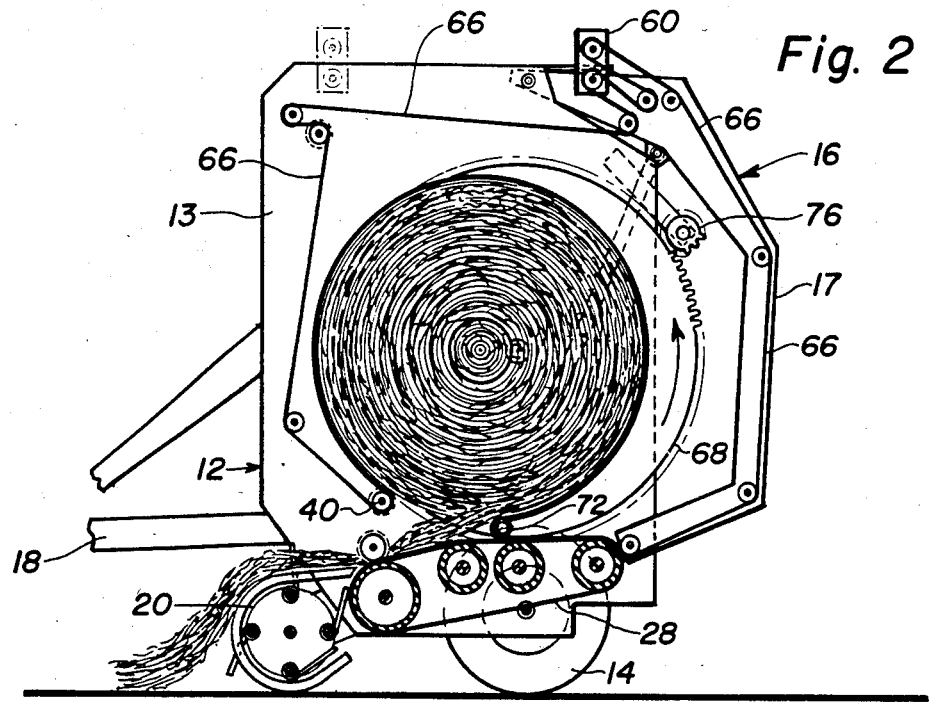
FIG. 2 is a side view of the roll baler of FIG. 1 when a roll bale of predetermined diameter has been formed.
Figure 3:
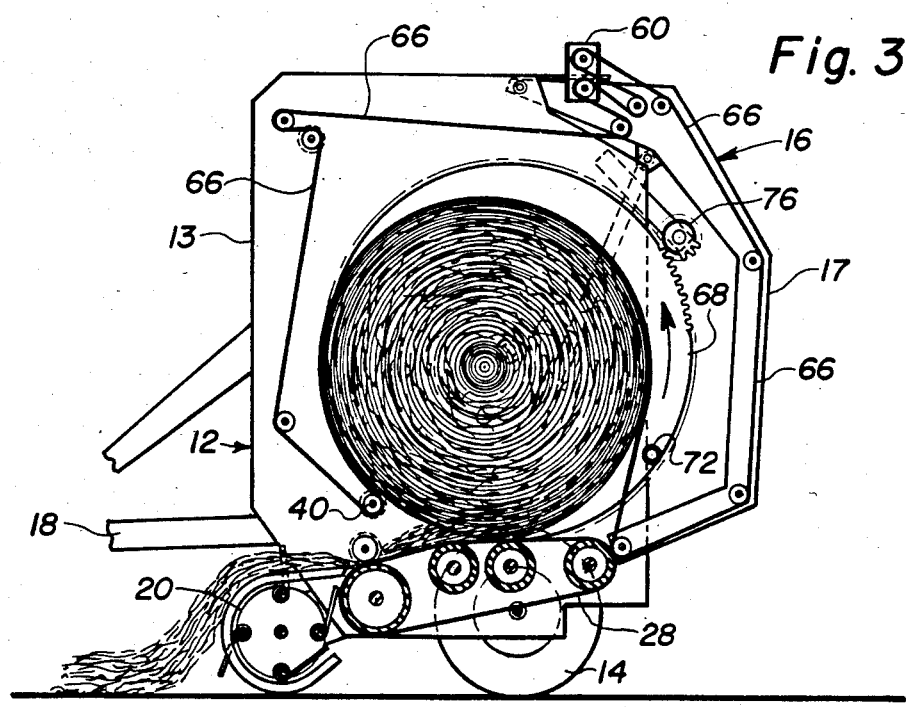
FIG. 3 is a side view of the roll baler of FIG. 1 during completion of a roll bale.
Figure 4:
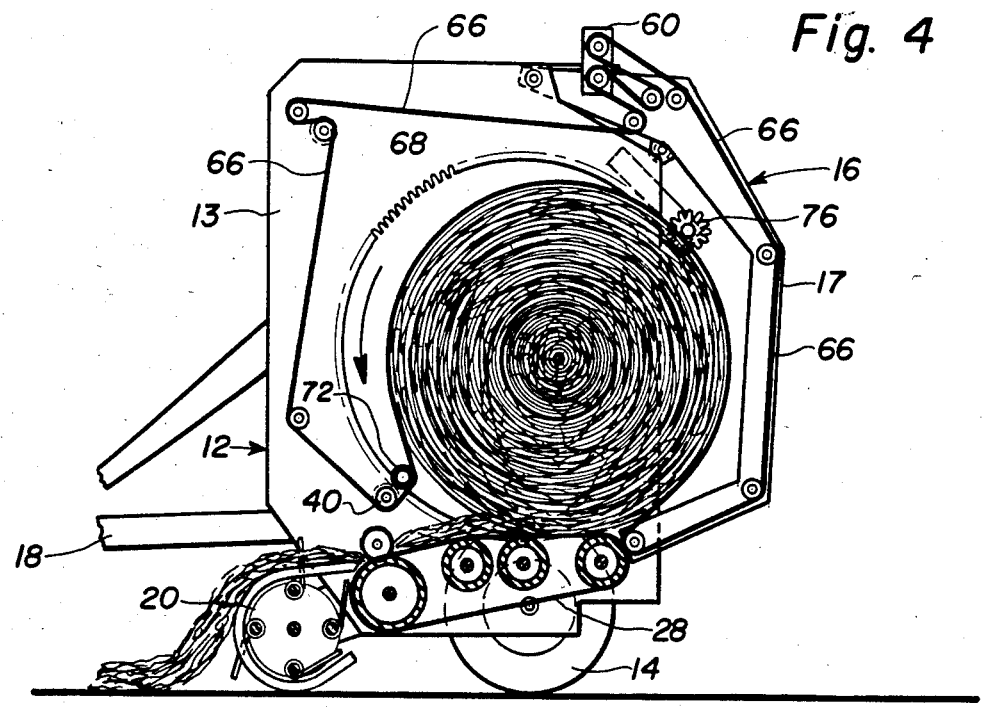
FIG. 4 is another side view of the roll baler of FIG. 1 as a roll bale is being completed.
Figure 5:
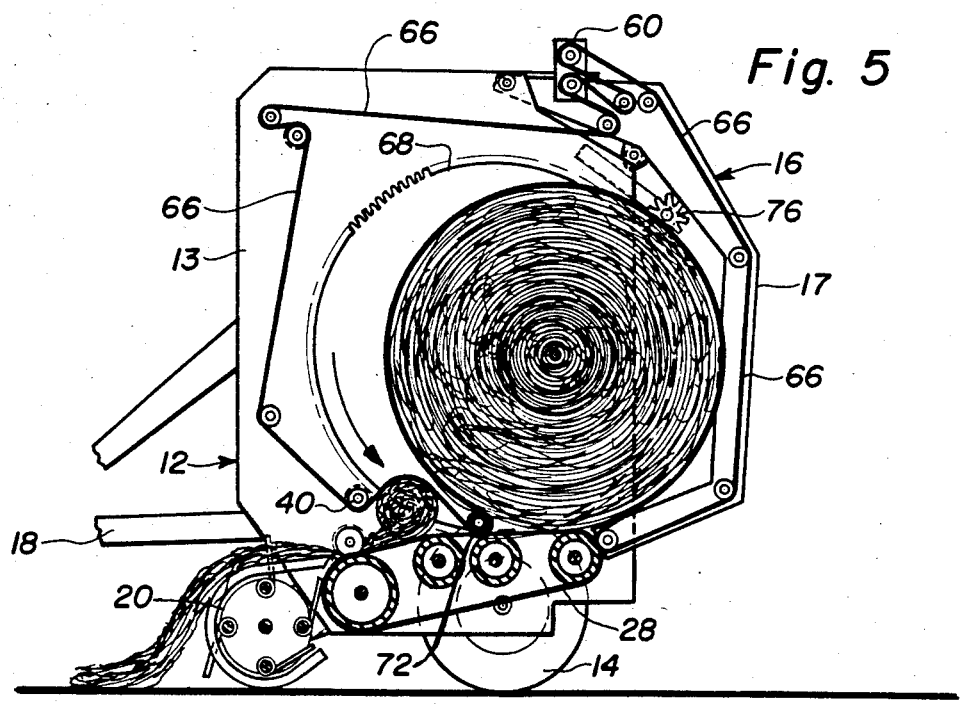
FIG. 5 is a side view of the roll baler of FIG. 1 when one roll bale has been completed and another roll bale is being started.

When a bale of predetermined diameter has been formed, the electric clutch and brake device (not shown) is operated as a clutch so that the sprockets 76 are driven via the shaft 80 thereby causing rotation of the disks 68 in the direction indicated in FIG. 2 and movement of the indexing roller 72 from its home position in a substantially circular path of travel generally about the periphery of the bale. Initial rotation of the disks 68 moves the indexing roller 72 out of engagement with the belts 66 as seen in FIG. 3 while crop material continues to be added to the bale. When the indexing roller 72 has moved to the position shown in FIG. 4 where it is adjacent the roller 40, the bale will have moved slightly rearward thereby partially extending into the tailgate 16. At this point, the belts 66 are disconnected from the PTO of the tractor by disengaging the drive means (not shown) between the rollers 40 and 44 and the tractor PTO. The belts 66 remain disconnected from the tractor PTO until the disks 68 complete one full 360 revolution and the indexing roller 72 returns to its home position as shown in FIG. 5.

When the indexing roller 72 is returned to its home position again, the bale starting zone 69 is consequently reformed and the belts 66 are reconnected to the tractor PTO. A new bale is then started in the bale starting zone 69 while the tailgate 16 is moved to its open position as shown in FIG. 6 by extending the hydraulic cylinders 26, and the completed bale is discharged. Subsequent to discharging the completed bale from the roll baler 10, the tailgate 16 is moved back to its closed position of FIG. 1 and the baling operation continues without interruption.

It will be understood that the present invention is not limited to the particular roll baler 10 which is similar to the roller disclosed in U.S. Pat. No. 3,914,926. Accordingly, the present invention may be incorporated in other types of roll balers. extending into the tailgate 16. At this point, the belts 66 are disconnected from the PTO of the tractor by disengging the drive means (not shown) between the rollers 40 and 44 and the tractor PTO. The belts 66 remain disconnected from the tractor PTO until the disks 68 complete one full 360 revolution and the indexing roller 72 returns to its home position as shown in FIG. 5.

When the indexing roller 72 is returned to its home position again, the bale starting zone 69 is consequently reformed and the belts 66 are reconnected to the tractor PTO. A new bale is then started in the bale starting zone 69 while the tailgate 16 is moved to its open position as shown in FIG. 6 by extending the hydraulic cylinders 26, and the completed bale is discharged. Subsequent to discharging the completed bale from the roll baler 10, the tailgate 16 is moved back to its closed position of FIG. 1 and the baling operation continues without interruption.

It will be understood that the present invention is not limited to the particular roll baler 10 which is similar to the roller disclosed in U.S. Pat. No. 3,914,926. Accordingly, the present invention may be incorporated in other types of roll balers.

The drive rollers 40 and 44 are disengaged from the tractor PTO by utilizing a conventional clutch mechanism (not shown) which may be electrically, mechanically or hydraulically operated.

The following claims are intended to cover all modifications and variations of the preferred embodiment of the present disclosed herein without departing from the spirit and scope of the invention.

Having thus described the invention, what is claimed is:

1. A method of operating a baler for forming roll bales of crop material, said baler having upper and lower bale forming means cooperating to define a bale starting zone, said upper bale forming means extending around a single indexing guide member and around a drive member, said single indexing guide member having a home position for disposing said upper bale forming means proximate to said lower bale forming means at the rear of said bale starting zone, said method of operating said baler comprising the steps of:
   engaging said drive member with a power source to move said upper bale forming means in a direction to start a roll bale in said bale starting zone;
   moving said single indexing guide member from said home position in a substantially circular path of travel when said roll bale reaches a predetermined size;
   disengaging said drive member from said power source while said roll bale is being formed and when said single indexing guide member has been moved from said home position less than one full 360° revolution around said path of travel to another position; and
   reengaging said drive member with said power source when said single indexing guide member has been moved from said another position back to said home position thereby completing one full 360° revolution for said single indexing guide member around said path of travel during the formation of said roll bale.

2. The method of claim 1, wherein said another position of said indexing guide member is located part of the way around said circular path of travel.

3. The method of claim 2, wherein said another position of said indexing guide member is also located adjacent said drive member.

* * * * *